US011428204B2

(12) United States Patent
Messing et al.

(10) Patent No.: US 11,428,204 B2
(45) Date of Patent: Aug. 30, 2022

(54) ROTOR BLADE OF A WIND TURBINE AND METHOD FOR DESIGNING SAME

(71) Applicant: Wobben Properties GmbH, Aurich (DE)

(72) Inventors: Ralf Messing, Aurich (DE); Mustafa Onur Kimilli, Munich (DE); Florian Rubner, Aurich (DE)

(73) Assignee: Wobben Properties GmbH, Aurich (DE)

( * ) Notice: Subject to any disclaimer, the term of this patent is extended or adjusted under 35 U.S.C. 154(b) by 161 days.

(21) Appl. No.: 16/756,680

(22) PCT Filed: Oct. 23, 2018

(86) PCT No.: PCT/EP2018/079039
§ 371 (c)(1),
(2) Date: Apr. 16, 2020

(87) PCT Pub. No.: WO2019/081510
PCT Pub. Date: May 2, 2019

(65) Prior Publication Data
US 2020/0248671 A1    Aug. 6, 2020

(30) Foreign Application Priority Data

Oct. 24, 2017 (DE) ..................... 10 2017 124 861.7

(51) Int. Cl.
*F03D 1/06* (2006.01)
*B29L 31/08* (2006.01)

(52) U.S. Cl.
CPC ......... *F03D 1/0675* (2013.01); *F03D 1/0641* (2013.01); *B29L 2031/085* (2013.01);
(Continued)

(58) Field of Classification Search
CPC .... F03D 1/0675; F03D 1/0641; F03D 1/0658; F03D 1/0633; B29L 2031/085; F05B 2230/60; F05B 2240/302; Y02E 10/72
See application file for complete search history.

(56) References Cited

U.S. PATENT DOCUMENTS 1,403,069 A   1/1922  Burne
2,400,388 A   5/1946  Campbell
(Continued)

FOREIGN PATENT DOCUMENTS

CA    2778548 A1 * 12/2012  ........... F03D 1/0641
CN    101059119 A    10/2007
(Continued)

OTHER PUBLICATIONS

Björck, A., "Coordinates and Calculations for the FFA-W1-xxx, FFA-W2-xxx and FFA-W3-xxx Series of Airfoils for Horizontal Axis Wind Turbines," The Aeronautical Research Institute of Sweden, 1990, 150 pages, Stockholm, Sweden.
(Continued)

*Primary Examiner* — David E Sosnowski
*Assistant Examiner* — Wayne A Lambert
(74) *Attorney, Agent, or Firm* — Seed Intellectual Property Law Group LLP (57) ABSTRACT

A two-part or multi-part rotor blade and also to a method which is associated with it. The rotor blade is split into at least one rotor blade component which is close to the hub and one rotor blade component which is remote from the hub at a separation point in the longitudinal direction, wherein the rotor blade component which is close to the hub and the rotor blade component which is remote from the hub can be connected at the separation point for operation of the wind turbine. A ratio of profile thickness to profile depth, called relative thickness, at the separation point lies within a range
(Continued)

of from 0.4 to 0.5. An improved two-part or multi-part rotor blade in spite of the unexpectedly high relative thicknesses.

19 Claims, 3 Drawing Sheets

(52) U.S. Cl.
CPC ........ *F03D 1/0658* (2013.01); *F05B 2230/60* (2013.01); *F05B 2240/302* (2013.01)

(56) References Cited

U.S. PATENT DOCUMENTS

| | | | |
|---|---|---|---|
| 2,428,936 A | 10/1947 | Hunter | |
| 2,442,783 A | 6/1948 | Senn | |
| 2,453,403 A | 11/1948 | Bogardus | |
| 2,465,007 A | 3/1949 | Bragdon et al. | |
| 2,485,543 A | 10/1949 | Andreau | |
| 2,616,509 A | 11/1952 | Thomas | |
| 2,622,686 A | 12/1952 | Chevreau et al. | |
| 2,934,150 A | 4/1960 | Fink | |
| 3,184,187 A | 5/1965 | Isaac | |
| 3,463,420 A | 8/1969 | Butler et al. | |
| 3,874,816 A | 4/1975 | Sweeny et al. | |
| 3,987,984 A | 10/1976 | Fischer | |
| 4,247,253 A | 1/1981 | Seki et al. | |
| 4,274,011 A | 6/1981 | Garfinkle | |
| 4,408,958 A | 10/1983 | Schacle | |
| 4,419,053 A | 12/1983 | Swearingen, Jr. | |
| 4,498,017 A | 2/1985 | Parkins | |
| 4,519,746 A | 5/1985 | Wainauski et al. | |
| 4,613,760 A | 9/1986 | Law | |
| 4,668,169 A | 5/1987 | Perry | |
| 4,692,095 A | 9/1987 | Lawson-Tancred | |
| 4,699,568 A | 10/1987 | Harlamert et al. | |
| 4,732,542 A | 3/1988 | Hahn et al. | |
| 4,773,824 A | 9/1988 | Kiss | |
| 4,773,825 A | 9/1988 | Rodde et al. | |
| 4,830,574 A | 5/1989 | Wainauski et al. | |
| 4,858,852 A * | 8/1989 | Henne ...................... | B64C 3/14 244/35 R |
| 4,976,587 A | 12/1990 | Johnston et al. | |
| 5,096,378 A | 3/1992 | Jamieson | |
| 5,106,265 A | 4/1992 | Holzem | |
| 5,320,491 A | 6/1994 | Coleman et al. | |
| 5,417,548 A | 5/1995 | Tangier et al. | |
| 5,474,415 A | 12/1995 | Becker et al. | |
| 5,474,425 A | 12/1995 | Lawlor | |
| 5,527,151 A | 6/1996 | Coleman et al. | |
| 5,562,420 A | 10/1996 | Tangler et al. | |
| 5,570,859 A | 11/1996 | Quandt | |
| 5,570,997 A | 11/1996 | Pratt | |
| 6,015,115 A | 1/2000 | Dorsett et al. | |
| 6,068,446 A | 5/2000 | Tangier et al. | |
| 6,133,716 A | 10/2000 | Schutten | |
| 6,420,795 B1 | 7/2002 | Mikhail et al. | |
| 6,465,902 B1 | 10/2002 | Beauchamp et al. | |
| 6,503,058 B1 | 1/2003 | Selig et al. | |
| 6,523,781 B2 | 2/2003 | Ragner | |
| 6,682,302 B2 | 1/2004 | Noble | |
| 6,899,523 B2 | 5/2005 | Wobben | |
| 6,951,443 B1 | 10/2005 | Blakemore | |
| 7,204,674 B2 | 4/2007 | Wobben | |
| 7,357,624 B2 | 4/2008 | Wobben | |
| D584,686 S | 1/2009 | Gudewer | |
| 7,708,530 B2 | 5/2010 | Wobben | |
| 7,946,803 B2 | 5/2011 | Wobben | |
| 8,172,539 B2 | 5/2012 | Kootstra | |
| 8,348,622 B2 * | 1/2013 | Bech ................... | B29C 66/7212 416/223 R |
| 8,403,642 B2 | 3/2013 | Carroll et al. | |
| 8,668,462 B2 | 3/2014 | Fischer et al. | |
| 8,678,770 B2 * | 3/2014 | Enevoldsen ......... | F03D 1/0633 416/223 R |
| 8,777,573 B2 | 7/2014 | Hibbard et al. | |
| 8,814,525 B2 | 8/2014 | Petsche et al. | |
| 8,894,374 B2 * | 11/2014 | Fuglsang .............. | F03D 1/0675 416/228 |
| 8,911,214 B2 | 12/2014 | Fukami | |
| 9,759,185 B2 | 9/2017 | Bohlen | |
| 9,932,960 B2 | 4/2018 | Petsche et al. | |
| 10,125,741 B2 * | 11/2018 | Hayden ................. | F03D 1/0666 |
| 2003/0099546 A1 | 5/2003 | Stiesdal et al. | |
| 2004/0105752 A1 | 6/2004 | Wobben | |
| 2004/0115057 A1 | 6/2004 | Wobben | |
| 2007/0297896 A1 | 12/2007 | Wobben | |
| 2007/0297909 A1 | 12/2007 | Wobben | |
| 2008/0069699 A1 | 3/2008 | Bech | |
| 2010/0196166 A1 | 8/2010 | Enevoldsen et al. | |
| 2011/0135486 A1 * | 6/2011 | Bendel .................... | F03D 1/065 428/114 |
| 2011/0150664 A1 | 6/2011 | Mickeler et al. | |
| 2011/0293432 A1 | 12/2011 | Hibbard et al. | |
| 2012/0020803 A1 * | 1/2012 | Lees ...................... | F03D 7/022 416/233 |
| 2012/0280509 A1 | 11/2012 | Fukami | |
| 2013/0115098 A1 | 5/2013 | Madsen et al. | |
| 2015/0064017 A1 | 3/2015 | Bohlen | |

FOREIGN PATENT DOCUMENTS

| | | |
|---|---|---|
| CN | 102003332 A | 4/2011 |
| CN | 103168172 A | 6/2013 |
| DE | 3126677 A1 | 1/1983 |
| DE | 3913505 A1 | 11/1989 |
| DE | 4002972 C2 | 8/1991 |
| DE | 4428731 A1 | 2/1996 |
| DE | 4435606 A1 | 4/1996 |
| DE | 19719221 C1 | 10/1998 |
| DE | 69415292 T2 | 7/1999 |
| DE | 69513871 T2 | 7/2000 |
| DE | 19963086 C1 | 6/2001 |
| DE | 10307682 A1 | 1/2004 |
| DE | 10319246 A1 | 12/2004 |
| DE | 102008033411 A1 | 3/2009 |
| DE | 102008052858 A1 | 4/2010 |
| DE | 102011050901 A1 | 12/2011 |
| DE | 102012109170 A1 | 3/2013 |
| DE | 102012206109 B3 | 9/2013 |
| DE | 102013202666 A1 | 8/2014 |
| EP | 0283730 A1 | 9/1988 |
| EP | 0375382 A2 | 6/1990 |
| EP | 1978245 A1 | 10/2008 |
| EP | 2339171 A2 | 6/2011 |
| EP | 2366891 A1 | 9/2011 |
| FR | 908631 A | 4/1946 |
| FR | 2290585 A | 6/1976 |
| FR | 2587675 A1 | 3/1987 |
| GB | 2311978 A | 10/1997 |
| JP | 55-153870 A | 12/1980 |
| JP | S61140181 A | 8/1986 |
| JP | 5-180146 A | 7/1993 |
| RU | 2359151 C1 | 6/2009 |
| SU | 577300 | 11/1977 |
| SU | 1539378 A1 | 1/1990 |
| WO | 00/73651 A1 | 12/2000 |
| WO | 01/55590 A1 | 8/2001 |
| WO | 01/83983 A1 | 11/2001 |
| WO | 02/051730 A2 | 7/2002 |
| WO | 03/104646 A1 | 12/2003 |
| WO | 2010/048958 A2 | 5/2010 |
| WO | 2010/086297 A2 | 8/2010 |
| WO | 2012/007058 A1 | 1/2012 |
| WO | 2012/164305 A1 | 12/2012 |
| WO | WO-2013075718 A1 * | 5/2013 ........... F03D 1/0641 |

OTHER PUBLICATIONS

Timmer et al., "Thick Airfoils for HAWTs," Journal of Wind Engineering and Industrial Aerodynamics, vol. 39, Amsterdam, Netherlands, 1992, pp. 151-160.

(56) References Cited

OTHER PUBLICATIONS

"Wortmann FX 77-W-343(FX77W343,Contour Data)", Nihon University Aero Student Group, NASG Airfoil Database, XP002253850, http://www.nasg.com/afdb/show-airfoil-e.phtml?id=338, download date of Oct. 2, 2006.

* cited by examiner

ROTOR BLADE OF A WIND TURBINE AND METHOD FOR DESIGNING SAME

BACKGROUND

Technical Field

The present invention relates to a rotor blade of a wind turbine and to a method for designing a rotor blade of a wind turbine. The present invention relates, in particular, to a two-part or multi-part rotor blade and to a method which is associated with it.

Description of the Related Art

Rotor blades for wind turbines are known. In the past, one-piece, unsplit rotor blades were used for the most part but these are gradually reaching limits, in particular in respect of transportation, owing to ever-increasing dimensions.

For this reason, manufacture of split rotor blades, which are easier to transport than unsplit blades and are assembled by a fitter at the site of erection, has begun. Split rotor blades present some challenges in terms of design and construction of the rotor blades since, amongst other things, ease of assembly at the site of erection but also the blade dimensions, which are increased owing to the connection point, and therefore the additional loads to be expected on the turbine in comparison to a one-part design have to be taken into consideration.

BRIEF SUMMARY

Provided is a split rotor blade which may minimize the consequences of the known disadvantages and difficulties encountered with split rotor blades.

Provided is a rotor blade of a wind turbine, wherein the rotor blade is split into at least one rotor blade component which is close to the hub and one rotor blade component which is remote from the hub at a separation point in the longitudinal direction, wherein the rotor blade component which is close to the hub and the rotor blade component which is remote from the hub can be connected at the separation point for operation of the wind turbine, wherein a ratio of profile thickness to profile depth, called relative thickness, at the separation point lies within a range of from 0.4 to 0.5.

The relative thickness within a range of from 0.4 to 0.5 at the separation point constitutes an unexpectedly high value. An advantageous blade can ultimately be expected in spite of the high value of the relative thickness. From an aerodynamic point of view, profiles with high relative thicknesses are specifically disadvantageous since they firstly have poorer lift/drag ratios than profiles with a lower relative thickness and secondly also have lower lift coefficients in general. However, this effect, which is disadvantageous from an aerodynamic point of view, is compensated for in that the profiles with higher relative thicknesses are associated with structural advantages which allow, in particular, a lighter-weight construction of the rotor blade. A particularly advantageous combination of aerodynamically effective blade and comparatively low turbine loads for rotor blades which are split into two can be achieved owing to the range of from 0.4 to 0.5 selected.

The relative thickness at the separation point particularly preferably lies within a range of from 0.42 to 0.46. It has been found that particularly efficient rotor blades which are split into two can be realized within this range of values in particular.

In one embodiment, a sum of the lengths of the rotor blade component which is close to the hub and the rotor blade component which is remote from the hub, which rotor blade components are connected at the separation point, gives a blade length of the rotor blade, wherein the separation point is located in a region of from 25% to 38% of the blade length as viewed from the hub, in particular in a region of from 27% to 33% of the blade length as viewed from the hub.

The separation point is always associated with a higher local weight than the surrounding points of the rotor blade. For this reason, it would actually be desirable to place the separation point as close to the rotor hub as possible. However, as a result of this, the advantages of a two-part or multi-part rotor blade are canceled out, specifically the advantages in respect of transportation in particular. In the ideal case, this would mean providing the separation point in the region of 50% of the blade length. It has been found that providing the separation point in the narrow region between 25% and 38% of the blade length, in particular between 27% and 33% of the blade length, as a compromise between the mass distribution of the rotor blade that is established and the utilization of the advantages of a two-part or multi-part rotor blade is particularly effective.

In one embodiment, an absolute thickness of the rotor blade at the separation point is at least 1.70 m.

Since the absolute thickness of the rotor blade at the separation point is at least 1.70 m, it is possible for a fitter to reach the separation point within the rotor blade and to connect the two rotor blade components to one another at the separation point. The requirement in respect of the absolute thickness at the separation point together with the position of the separation point and the relative thickness at the separation point lead to a rotor blade which can be implemented within the generally known transportation limitations. In particular, a rotor blade which is designed in this way does not lead to a profile depth which is associated with difficulties in respect of transportation.

In one embodiment, a mean relative thickness between a first position of the relative blade length and a second position of the relative blade length is defined as a ratio of the definite integral of the relative thickness from the first position to the second position to a distance between the first position and the second position.

The mean relative thickness of from 20% to 30% of the relative blade length is preferably at least 0.460.

As an alternative or in addition, the mean relative thickness of from 20% to 50% of the relative blade length is preferably at least 0.390.

As an alternative or in addition, the mean relative thickness of from 20% to 70% of the relative blade length is preferably at least 0.33, in particular at least 0.35.

It has been found that, in particular, the region which is close to the hub of from 0% to 20% of the blade length can be designed substantially uninfluenced by the design as a two-part or multi-part rotor blade. However, in the region starting from 20%, in particular up to 30 or 50 or 70% of the relative blade length, the mean relative thickness assumes a considerably higher value than was the case in known rotor blades, in particular in known one-part rotor blades. In other words, the relative thickness, which is already excessively high at the separation point, in the range of from 0.4 to 0.5 is evident over a further region of the rotor blade, so that an extraordinarily high relative thickness prevails over further regions of the rotor blade.

An advantageous blade can ultimately be expected in spite of the high value of the relative thickness. From an aerodynamic point of view, profiles with high relative thicknesses are specifically disadvantageous since they firstly have poorer lift/drag ratios than profiles with a lower relative thickness and secondly also have lower lift coefficients in general. However, this effect, which is disadvantageous from an aerodynamic point of view, is compensated for in that the aerodynamic disadvantages which are associated with a higher relative thickness in rotor blades which are split into two are balanced out by the structural advantages which are obtained at the same time. This is achieved, in particular, in that the mass of the outer blade can be kept low owing to the higher relative thickness.

In one embodiment, a structural dimensionless parameter is defined as the definite integral of the relative thickness over a region of the relative blade length, wherein a lower limit of the integral is defined at a position of 20% of the blade length and the structural dimensionless parameter can be evaluated for any desired values of the upper limit.

The structural dimensionless parameter for an upper limit of 45% of the blade length is preferably at least 0.1.

As an alternative or in addition, the structural dimensionless parameter for an upper limit of 80% of the blade length is preferably at least 0.2.

As an alternative or in addition, the structural dimensionless parameter for the upper limit of 45% of the blade length is preferably at most 0.12.

As an alternative or in addition, the structural dimensionless parameter for the upper limit of 80% of the blade length is preferably at most 0.24.

The structural dimensionless parameter which is defined in this way has been found to be particularly suitable for compensating for the high mass of the inner blade, including the separation point, over the further blade course, without having a negative influence on the turbine loads. If the structural dimensionless parameter is kept within the preferred range when designing the rotor blade, a two-part or multi-part rotor blade of particularly optimum design is accordingly obtained as a result.

Provided is a wind turbine comprising at least one rotor blade according to the invention. The wind turbine is also improved owing to the use of the rotor blades according to the invention. In particular, the advantageous refinements of the rotor blades according to the invention can also be analogously applied to the wind turbine.

Provided is a wind farm comprising a plurality of wind turbines according to the invention. The plurality of wind turbines according to the invention assist in optimizing the wind farm. In particular, the advantageous refinements of the rotor blades and wind turbines according to the invention can also be analogously applied to the wind farm.

Provided is a method for designing a rotor blade of a wind turbine. The rotor blade is split into at least one rotor blade component which is close to the hub and one rotor blade component which is remote from the hub at a separation point in the longitudinal direction, wherein the rotor blade component which is close to the hub and the rotor blade component which is remote from the hub can be connected at the separation point for operation of the wind turbine. The method comprises a step of defining a ratio of profile thickness to profile depth, called relative thickness, at the separation point within a range of from 0.4 to 0.5, in particular within a range of from 0.42 to 0.46.

The method allows the same advantages to be achieved as are achieved by the rotor blade according to the invention. In particular, carrying out the method according to the invention leads to a rotor blade according to the invention. The preferred refinements of the embodiments of the rotor blade can also be transferred to the method in an analogous manner.

In one embodiment of the method, for the purpose of designing the rotor blade, a trade-off is made between a structurally necessary higher relative thickness at the separation point and an aerodynamically desired lower relative thickness at the separation point on the basis of a mean relative thickness, wherein the mean relative thickness between a first position of the relative blade length and a second position of the relative blade length is defined as a ratio of the definite integral of the relative thickness from the first position to the second position to a distance between the first position and the second position.

The mean relative thickness of from 20% to 30% of the relative blade length is preferably at least 0.460.

As an alternative or in addition, the mean relative thickness of from 20% to 50% of the relative blade length is preferably at least 0.390.

As an alternative or in addition, wherein the mean relative thickness of from 20% to 70% of the relative blade length is preferably at least 0.33, in particular at least 0.35.

In one embodiment of the method, for the purpose of designing the rotor blade, a trade-off is made between a structurally necessary higher relative thickness at the separation point and an aerodynamically desired lower relative thickness at the separation point on the basis of a structural dimensionless parameter, wherein the structural dimensionless parameter is defined as the definite integral of the relative thickness over a region of the relative blade length, wherein a lower limit of the integral is defined at a position of 20% of the blade length and the structural dimensionless parameter can be evaluated for any desired values of the upper limit.

The structural dimensionless parameter for an upper limit of 45% of the blade length is preferably at least 0.1.

As an alternative or in addition, the structural dimensionless parameter for an upper limit of 80% of the blade length is preferably at least 0.2.

As an alternative or in addition, the structural dimensionless parameter for the upper limit of 45% of the blade length is preferably at most 0.12.

As an alternative or in addition, the structural dimensionless parameter for the upper limit of 80% of the blade length is preferably at most 0.24.

BRIEF DESCRIPTION OF THE SEVERAL VIEWS OF THE DRAWINGS

Further advantages and preferred refinements will be described more precisely below with reference to the exemplary embodiments of the appended figures, in which.

DETAILED DESCRIPTION

Figure 1:
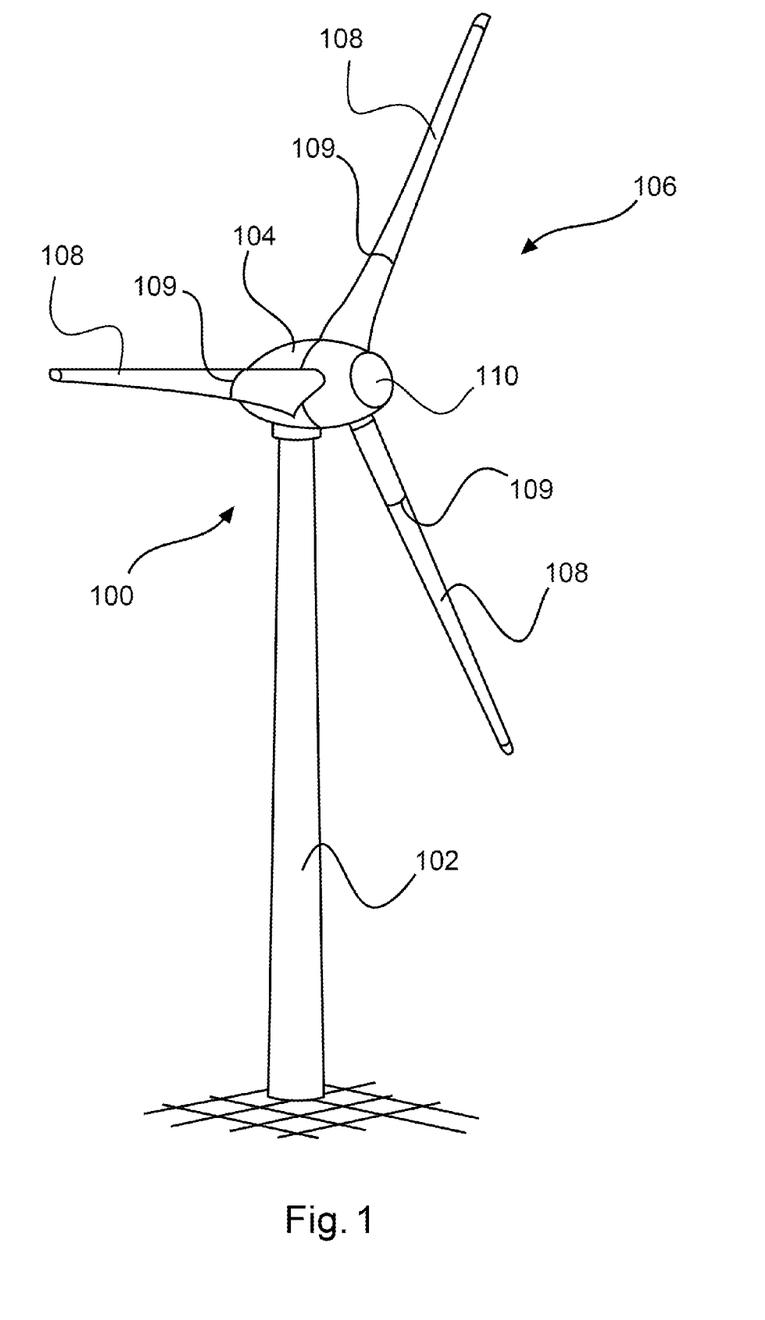
FIG. 1 shows, schematically and by way of example, a wind turbine.

FIG. 1 shows a wind turbine 100 comprising a tower 102 and a nacelle 104. A rotor 106 with three rotor blades 108 and a spinner 110 is arranged on the nacelle 104. During operation, the rotor 106 is set in rotary motion by the wind and thereby drives a generator in the nacelle 104. The spinner 110 encases a rotor hub (not shown) of the rotor 106.

The rotor blades 108 are each split into two and have a separation point 109 which separates a rotor blade component which is close to the hub from a rotor blade component which is remote from the hub. In other examples, rotor blades 108 which are split into more than two, for example, which are split into three or which are split into four, and have more than one separation point are equally conceivable.

Split rotor blades 108 are easier to transport than unsplit rotor blades 108 and furthermore also provide advantages with respect to production, for example, by using winding techniques. However, one known disadvantage of split rotor blades 108 is the generally higher blade mass than the unsplit rotor blades 108 of similar dimensions. The shown rotor blades 108, which are split into two, accordingly generally lead to higher loads on the wind turbine 100.

For assembly purposes, the rotor blade component, which is close to the hub and the rotor blade component, which is remote from the hub are, for example, screwed together at the separation point 109 on the inside of the blade at the site of erection. In order that this can be ensured by a fitter, the thickness of the rotor blade 108 at the separation point 109 is, for example, at least 1.70 m. Other connection concepts can accordingly be provided given smaller thicknesses at the separation point 109.

For optimum distribution of the loads, the separation point 109 would have a cylindrical profile with a relative thickness in the region of 1. However, since the separation point 109 lies in a region of the rotor blade 108, in particular in a region of from 25 to 38% of the blade length, at which considerable effects on the yield can already be detected, profiling should be performed. Accordingly, for aerodynamic reasons, the relative thickness of the profiling at the separation point 109, that is to say the ratio of blade thickness to blade depth at the separation point 109, should be as low as possible. However, a low relative thickness in the region of the separation point 109 would, as directly follows from the definition of the relative blade thickness, lead to high blade depths at the separation point 109, which would in turn have a disadvantageous effect both on turbine loads and on the transportation of the rotor blades 108.

It has been found to be particularly preferable to define the separation point at a relative thickness in the range of from 0.4 to 0.5, in particular of from 0.42 to 0.46. This allows a rotor blade to be obtained which takes into account both the loads to be expected and the aerodynamic efficiency but also the mass of the rotor blade 108 as a whole in an appropriate manner.

In comparison to one-part rotor blades, this results, in particular owing to the separation point 109, in relatively high thicknesses in that region of the rotor blade 108 which is close to the hub.

Figure 2:
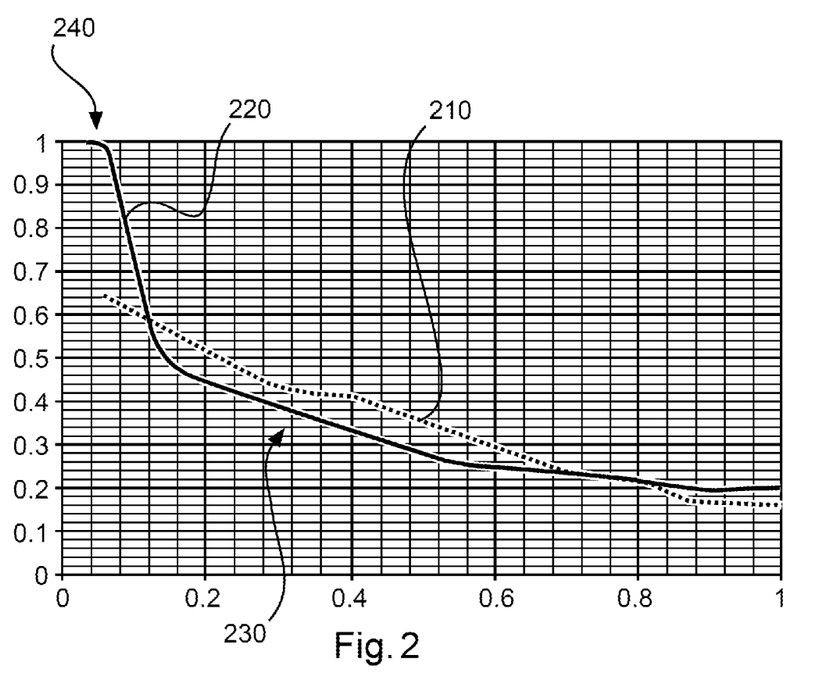
FIG. 2 shows, schematically and by way of example, curves of relative blade thicknesses of rotor blades.

FIG. 2 shows, schematically and by way of example, a curve 210 of the relative blade thickness of a rotor blade 108 which is split into two. For comparison, the same figure illustrates a curve 220 of the relative blade thickness of a known one-part rotor blade as a line. It can be seen that the relative thickness curve 210 lies above the relative thickness curve 220 over a wide course of the rotor blade length. This means that the rotor blade 108 which is split into two has a higher relative thickness than known rotor blades over a wide course in order to keep the mass of the outer blade low and thereby to compensate for the high mass of the inner blade, including the separation point 109, as far as possible and to keep the total mass of the rotor blade 108 in respect of the turbine loads as low as possible.

A region of the separation point 109 is indicated by an arrow 230. In the region of the rotor hub, which region is identified by an arrow 240, the known thickness curve 220 has a circular-cylindrical profile which can be established from the relative thickness of 1. Further profile curves 220, which do not have a circular-cylindrical shape in the hub region 240, are likewise known. However, in comparison to the rotor blade 108, all of the known rotor blades and, respectively, their thickness curves 220 have, in the region of the separation point 230, that is to say particularly between 25% and 38% of the rotor blade length, relative thicknesses which lie considerably below the thickness curve 210.

Figure 3:
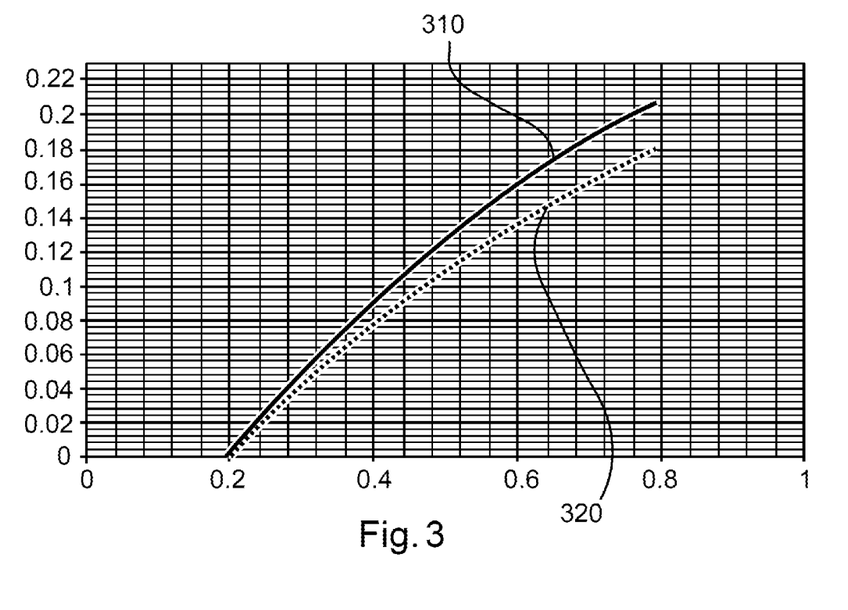
FIG. 3 shows, schematically and by way of example, curves of a structural dimensionless parameter over the blade length, which is standardized with the maximum rotor blade length, of rotor blades.
Figure 4:
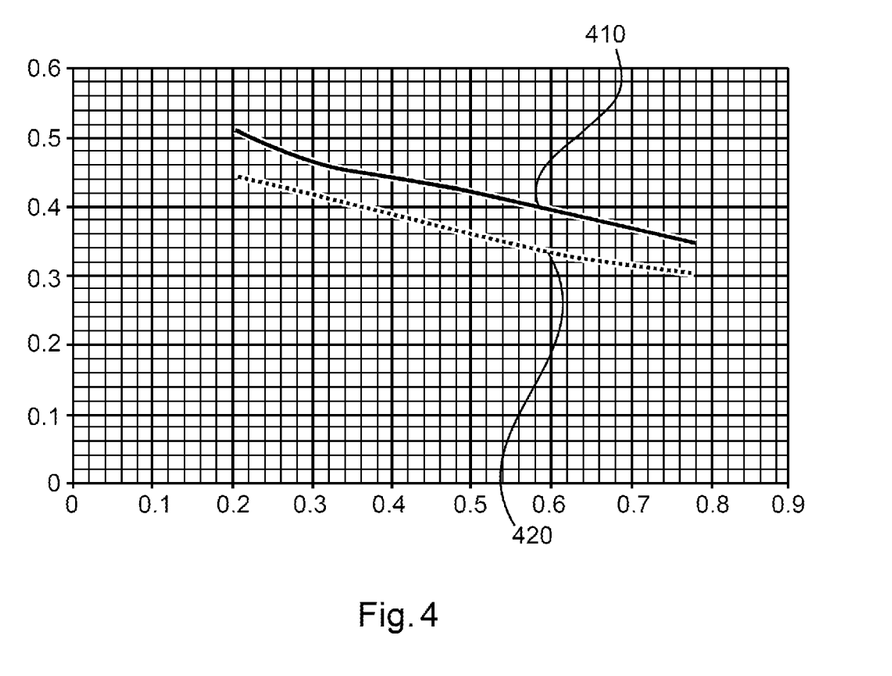
FIG. 4 shows, schematically and by way of example, curves of a mean relative thickness over the blade length, which is standardized with the maximum rotor blade length, of rotor blades.

In FIG. 2 and also further FIGS. 3 and 4, the standardized rotor blade radius, that is to say a position in the longitudinal direction of the rotor blade starting from the hub, which position has been standardized with the length of the rotor blade, is plotted on the horizontal axis.

Therefore, balancing out the aerodynamically critical profiles with high relative thicknesses in relation to the structurally advantageous thickness profiles is achieved. This is particularly difficult owing to the separation point 109, in particular in the case of rotor blades 108 which are split into two or more parts. To achieve this, provided is a dimensionless parameter F which corresponds substantially to an integral of the relative thickness:

$$F = \int_{x1}^{x2} \frac{d}{t} dx$$

Here, d is the thickness of the rotor blade 108 at a relative position $$x = \frac{r}{R}$$

and t is the local profile depth at the point x.

The curve of the dimensionless parameter F is schematically shown for several different rotor blades in FIG. 3. Here, the value 0.2 has proven particularly advantageous as the lower integral limit $x_1$. Here, a curve 310 of the dimensionless parameter F corresponds to the curve which is calculated for a rotor blade 108, while a curve 320 corresponds to a comparison curve of a known one-part rotor blade. It can be seen that the dimensionless parameter F for the rotor blade 108 assumes a higher value than is the case for the known one-part rotor blades. It should be noted that only relative variables which are not provided with units are then used for calculating the dimensionless parameter. It goes without saying that other dimensionless parameters which take into account the characteristic curve of the rotor blades 108 can also be used as an alternative.

A further example is shown in FIG. 4 in which the mean relative thickness for various rotor blades is plotted with respect to the relative blade position. Here, a curve 410 likewise corresponds to an exemplary curve of the mean relative thickness of a rotor blade 108, while a curve 420 represents a known, one-part rotor blade by way of example. The mean relative thickness of the rotor blade lies considerably above the curve 420 of the known rotor blades over the entire plotted region. In other words, the curve 410 is always higher than the curve 420 of the known one-part rotor blade designs in the middle region of the blade between 0.2 and 0.8 of the relative blade length.

In this example, the mean relative blade thickness for the region starting from 0.2 of the relative blade radius is determined. That is to say, the range of from 0.2 up to the value which is plotted on the horizontal is determined. For calculation purposes, for example, the dimensionless parameter F can be formed with the lower limit $x_1=0.2$ and the result can be divided by the distance of the examined value from 0.2. It goes without saying that other ranges which do not necessarily begin at 0.2 can also be used for assessing the mean relative thickness. Therefore, for example, a range from 0.1 or else from 0.3 of the relative blade radius can also be examined.

The invention claimed is:

1. A rotor blade of a wind turbine, comprising:
a first rotor blade component that is close to a hub when mounted on a wind turbine, and a second rotor blade component that is remote from the hub, wherein the first and second rotor blade components are separable at a separation point in a longitudinal direction of the rotor blade,
wherein a ratio of a profile thickness to a profile depth, called relative thickness, at the separation point is within a range from 0.4 to 0.5,
wherein a sum of lengths of the first rotor blade component and the second rotor blade component provides a total blade length of the rotor blade, and
wherein the separation point is located in a region from 25% to 38% of the total blade length as referenced from the hub.

2. The rotor blade as claimed in claim 1, wherein an absolute thickness of the rotor blade at the separation point is at least 1.7 meters.

3. The rotor blade as claimed in claim 1, wherein a mean relative thickness between a first position of a relative blade length and a second position of the relative blade length is defined as a ratio of a definite integral of the relative thickness from the first position to the second position to a distance between the first position and the second position,
wherein the mean relative thickness from 20% to 30% of the relative blade length is at least 0.460.

4. The rotor blade as claimed in claim 1, wherein:
a structural dimensionless parameter is defined as a definite integral of a relative thickness over a region of a relative blade length, wherein a lower limit of the integral is defined at a position of 20% of the total blade length and the structural dimensionless parameter is evaluated for any desired values of an upper limit, and
the structural dimensionless parameter for an upper limit of 45% of the total blade length is at least 0.1.

5. The rotor blade as claimed in claim 4, wherein the structural dimensionless parameter for the upper limit of 45% of the blade length is at most 0.12.

6. A wind turbine comprising:
a hub; and
at least one rotor blade as claimed in claim 1, wherein the first rotor blade component of the at least one rotor blade is coupled to the hub.

7. A wind farm comprising a plurality of wind turbines as claimed in claim 6.

8. A method of forming a rotor blade of a wind turbine, the method comprising:
coupling a first rotor blade component to a second rotor blade component at a connection point, wherein the first rotor blade component is close to a hub when the rotor blade is mounted to the wind turbine, wherein the second rotor blade component is remote from the hub, wherein the connection point is at a separation point in a longitudinal direction of the rotor blade,
wherein a ratio of a profile thickness to a profile depth, called relative thickness, at the separation point is defined within a range of from 0.4 to 0.5,
wherein a sum of lengths of the first rotor blade component and the second rotor blade component provides a total blade length of the rotor blade, and
wherein the separation point is located in a region from 25% to 38% of the total blade length as referenced from the hub.

9. The method as claimed in claim 8, wherein:
a mean relative thickness between a first position of the relative blade length and a second position of a relative blade length is defined as a ratio of a definite integral of the relative thickness from the first position to the second position to a distance between the first position and the second position, and
the mean relative thickness of from 20% to 30% of the relative blade length is at least 0.460.

10. The method as claimed in claim 8 wherein:
a structural dimensionless parameter is defined as a definite integral of the relative thickness over a region of a relative blade length, wherein a lower limit of the integral is defined at a position of 20% of the total blade length and the structural dimensionless parameter is evaluated for any desired values of an upper limit, and
the structural dimensionless parameter for an upper limit of 45% of the total blade length is at least 0.1.

11. The method as claimed in claim 10, wherein the structural dimensionless parameter for the upper limit of 45% of the total blade length is at most 0.12.

12. The method as claimed in claim 11, wherein the structural dimensionless parameter for an upper limit of 80% of the total blade length is at most 0.24.

13. The method as claimed in claim 9, wherein a mean relative thickness from 20% to 50% of the relative blade length is at least 0.390.

14. The method as claimed in claim 8, wherein the ratio at the separation point is within a range from 0.42 to 0.46.

15. The rotor blade as claimed in claim 1, wherein the ratio at the separation point is within a range from 0.42 to 0.46.

16. The rotor blade as claimed in claim 1, wherein the separation point is located in a region from 27% to 33% of the total blade length.

17. The rotor blade as claimed in claim 3, wherein a mean relative thickness of from 20% to 50% of the relative blade length is at least 0.390.

18. The rotor blade as claimed in claim 4, wherein the structural dimensionless parameter for an upper limit of 80% of the total blade length is at least 0.2.

19. The rotor blade as claimed in claim 18, wherein the structural dimensionless parameter for the upper limit of 80% is at most 0.24.

* * * * *

UNITED STATES PATENT AND TRADEMARK OFFICE
CERTIFICATE OF CORRECTION

| | |
|---|---|
| PATENT NO. | : 11,428,204 B2 |
| APPLICATION NO. | : 16/756680 |
| DATED | : August 30, 2022 |
| INVENTOR(S) | : Ralf Messing et al. |

It is certified that error appears in the above-identified patent and that said Letters Patent is hereby corrected as shown below:

In the Claims

Column 8, Claim 9, Lines 21-22:
"position of a relative blade length"
Should read:
--position of the relative blade length--.

Column 8, Claim 17, Line 55:
"relative thickness of from"
Should read:
--relative thickness from--.

Signed and Sealed this
Tenth Day of September, 2024

Katherine Kelly Vidal
*Director of the United States Patent and Trademark Office*